(No Model.)

T. H. BELL.
FRUIT CLEANING MACHINE.

No. 523,394. Patented July 24, 1894.

WITNESSES
Albert A. Beares
A. Dixon

INVENTOR
Thos. H. Bell

UNITED STATES PATENT OFFICE.

THOMAS H. BELL, OF BRAMPTON, CANADA.

FRUIT-CLEANING MACHINE.

SPECIFICATION forming part of Letters Patent No. 523,394, dated July 24, 1894.

Application filed May 17, 1893. Serial No. 474,591. (No model.)

*To all whom it may concern:*

Be it known that I, THOMAS HAGYARD BELL, of the town of Brampton, in the county of Peel and Province of Ontario, Canada, have invented certain new and useful Improvements in Fruit-Cleaning Machines, of which the following is a specification.

My invention relates, particularly, to machines for cleaning dried fruit, and consists of the construction and combinations of elements hereinafter described and pointed out in the claims. I accomplish these objects by means of the mechanism illustrated in the accompanying drawings, in which similar numbers of reference refer to similar parts throughout, and—

Figure 1:
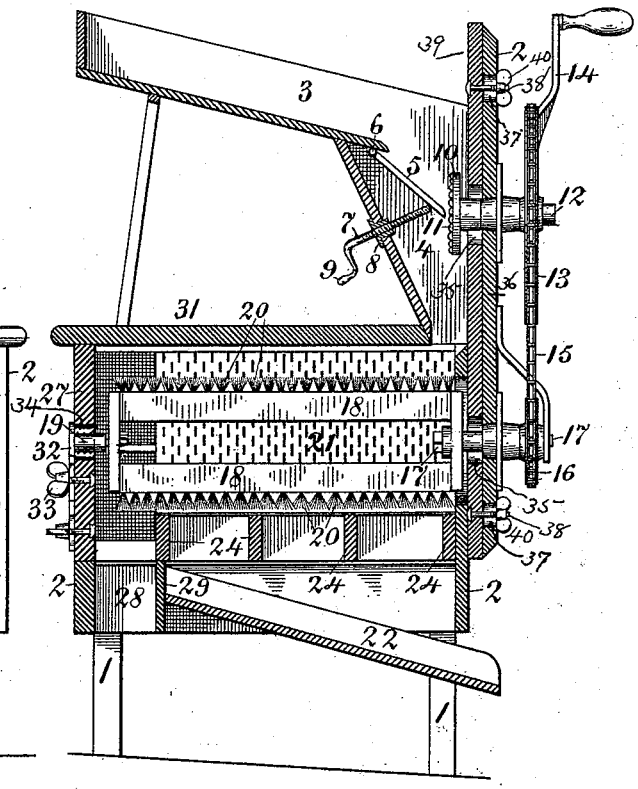
Figure 2:
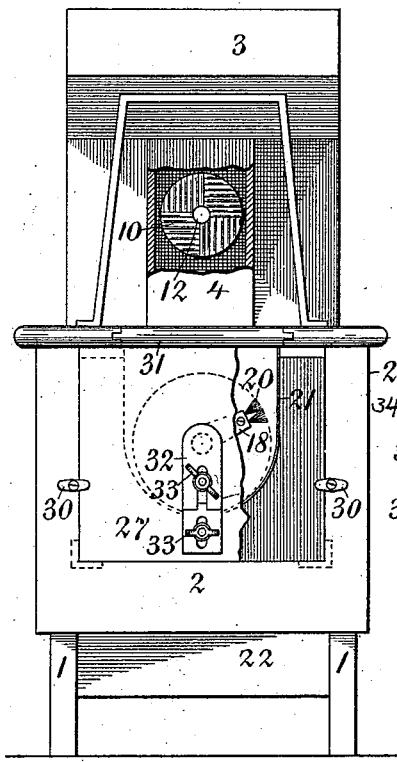
Figure 3:
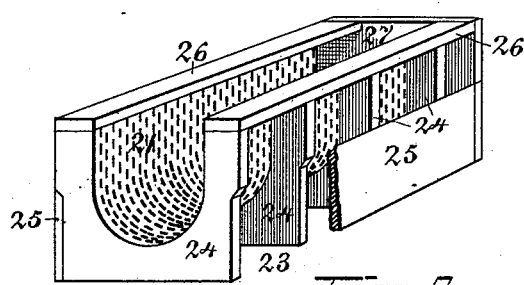
Figure 4:

Figure 1, represents a central vertical section through my improved fruit cleaning machine. Fig. 2, represents a rear end elevation of my machine having parts removed or broken away, to more fully illustrate its construction. Fig. 3, represents a perspective view of the screen in detail to show it fully, and—Fig. 4, represents an end view of the brushes employed in my machine.

My machine has a suitable frame, 1, of wood preferably inclosed by sides, 2, of the same material. Surmounted on the top of the machine is a hopper, 3, inclined so as to cause the fruit placed therein to gravitate down a chute, 4, at the front or lower end. In the chute, 4, is arranged an adjustable feed board, 5, supported by its upper edge to vibrate thereon by projections, 6, extending through holes in the sides of the chute, 4, and by its lower edge it is supported by a screw, 7, supported by a nut, 8, in the back board of the chute, 4. On the screw, 7, is provided a crank, 9, to operate the same by, or a hand wheel may be employed instead. In the front side of the chute, 4, is carried a disk, 10, having corrugations, 11, on one side, to act on the fruit coming in contact with it and break up any lumps therein and rub the fruit so as to remove stems and separate foreign substances sometimes found with certain fruits. The corrugations, 11, on the disk, 10, may be arranged radial or parallel by quadrants as shown, and instead of the corrugations, 11, projections formed by two series of grooves cut at right angles to one another, may be employed.

The disk, 10, is carried on a shaft, 12, having its bearing in a vertically adjustable bar 36, having slots 37 through which bolts 38 pass, said bolts having thumb nuts 40, whereby the bar is secured in position to the end board 39 which latter is also provided with vertical slots, 35, 35, in which the shafts 12 and 17 are permitted to be vertically adjustable, which extends out and has a sprocket wheel, 13, secured thereon, and a crank handle, 14, by which to drive the machine.

The sprocket wheel, 13, is connected by a chain, 15, to drive a smaller sprocket wheel, 16, on a shaft, 17, supported in the machine, also and beneath the shaft, 12. The shaft, 17, extends through the front side, 2, of the machine and is squared or otherwise adapted to fit into one end of a brush frame, 18, which has at its opposite end an adapted bearing for a pin, 19, to fit into and allow the frame, 18, to revolve thereon, and said pin has its vertical movement in a slot 34 in the end 27. The brush frame, 18, is provided with suitable bristle or other brushes, 20, along the horizontal bars of the said frame which are employed to clean the fruit held in the screen, 21, which is U-shaped in cross-section and constructed of perforated sheet metal having meshes to allow refuse stems and other substances to pass through said screen 21, and fall on an inclined spout, 22, supported by the lower portion of my machine.

The screen, 21, is supported by a frame, 23, consisting of a series of similarly U-shaped pieces, 24, secured at suitable intervals by longitudinal pieces, 25, and, 26, along the bottom and top of each side of said frame, 23. It will be observed that the screen, 21, does not extend the full length of the frame, 23, but is terminated before reaching the rear end which is closed by an end-board, 27, which supports the pin, 19, on which latter the rear end of the brush frame, 18, revolves and is carried. The opening between the end of the screen, 21, and the end-board, 27, of the frame, 23, provides a passage, 28, for the cleaned fruit to pass down and into any suitable receptacle placed beneath to receive it, the said passage, 28, being closed off from the end of the spout, 22, by a partition, 29, and by one of the U-shaped pieces, 24, coming directly above the partition, 29.

The frame, 23, and the brush frame, 18, are removable from the machine by releasing the end-board, 27, of said frame, 23, from its position where it is secured by buttons, 30, on the rear side, 2, and sliding the frame, 23, out, the pin, 19, will be drawn out of the brush frame, 18, allowing it to be removed. There is provided a cover, 31, for the brush frame, 18, and the screen, 21, which slides into suitable grooves in the top side of the machine.

The pin, 19, on which the rear end of the brush frame, 18, revolves, is supported directly by metal plate, 32, on the end board, 27, and is adjustable thereon as to height by thumb screws, 33, securing said plate, 32.

The operation of the machine is simple: the fruit is placed in the hopper, 3, and the screw, 7, adjusted to secure the feed board, 5, so as to regulate the amount of fruit that will pass between the board, 5, and the disk, 10, as it revolves. After the fruit is acted on by the disk, 10, it passes down through the lower end of the chute, 4, and enters the screen, 21, and comes in contact with the brush frame, 18, which carries the fruit round and cleans it, the refuse passing through the meshes of the screen, 21, and down the spout, 22, and the cleaned and rubbed fruit falls down the passage, 28.

I am aware that in machines for this purpose brushes extending along a cylindrical frame spirally and directly have been used and operating within a sieve or screen-cylindrical and inclined chutes and hopper are not new.

Having described my invention, and being aware of the above improvements by others heretofore, what I claim, and desire to secure by Letters Patent, is—

1. The combination with the main frame having the hopper and cleaning brush, of the pivoted inclined board, the screw for adjusting said board, the adjustable board or bar carrying the shafts, disk, sprocket wheels, chain and brush frame and adapted to be secured in position by the thumb nuts substantially as described.

2. In a fruit cleaning machine the combination with the main frame, brush frame, having the brushes, hopper and adjustable bar provided with the operating mechanism, of the removable end board having the slot therein, the pin 19 passed within said slot supporting one end of said brush frame and the slotted adjusting plate 32 secured to the end board by bolts and thumb nuts substantially as described.

3. In a machine of the character described the within described fruit-cleaner comprising the main frame having the hopper, the adjustable inclined feed board pivoted therein, the cranked screw 7 engaging said board, the sliding bar 36 having the shafts 12 and 17 journaled therein, the shaft 12 carrying the disk 10 and sprocket-wheel 13, the end board 39 having the slots 35, 35, the shaft 17 having the sprocket-wheel 16 and chain 15 connecting the two sprocket wheels, said shaft 17 having a square inner end to engage a square opening in one end of the brush frame, the pin or bearing 19 engaging the opposite end of said brush frame and provided with the adjusting plate 32, bolts and thumb nuts 33, the screen having side supporting pieces 25 and the discharge passages 28 and 29, all substantially as described.

Brampton, May 13, 1893.

THOS. H. BELL.

Witnesses:
ANNIE SHARP,
POLLY SHARP.